United States Patent
Brandl et al.

[11] Patent Number: 5,108,154
[45] Date of Patent: Apr. 28, 1992

[54] DRIVE ARRANGEMENT FOR SHEARING DRUMS

[75] Inventors: Erich Brandl, Grosslobming; Otto Krassnitzer; Alfred Zitz, both of Zeltweg, Austria

[73] Assignee: Voest-Alpine Zeltweg Gesellschaft M.b.H., Linz, Austria

[21] Appl. No.: 522,899

[22] Filed: May 14, 1990

[30] Foreign Application Priority Data

May 16, 1989 [AT] Austria .......................... A1161/89

[51] Int. Cl.⁵ .............................................. E21C 27/24
[52] U.S. Cl. .......................................... 299/76; 299/89
[58] Field of Search ................... 299/76, 78, 89, 81

[56] References Cited

U.S. PATENT DOCUMENTS

| | | | |
|---|---|---|---|
| 3,773,384 | 11/1973 | Anderson | 299/76 |
| 4,225,189 | 9/1980 | LeBegue | 299/89 X |
| 4,270,803 | 6/1981 | Baum | 299/89 X |

FOREIGN PATENT DOCUMENTS

| | | | |
|---|---|---|---|
| 3235533 | 3/1984 | Fed. Rep. of Germany | 299/81 |
| 3820264 | 1/1989 | Fed. Rep. of Germany | |
| 1587294 | 4/1981 | United Kingdom | |

*Primary Examiner*—David J. Bagnell
*Attorney, Agent, or Firm*—Cushman, Darby & Cushman

[57] ABSTRACT

A drive arrangement for shearing drums. Final gear reduction stages are arranged inside the shearing drum (5) and at least one reduction stage is designed as a planetary gear mechanism. The first gear reduction stage arranged inside the shearing drum (5) has intermediate gear wheels (21) rotatably fixed to a rigid intermediate gear wheel carrier (22) connected to a supporting arm (3) of the shearing drum (5). The intermediate gear wheels (21) are driven by a sun gear wheel (20) and interact with an outer internal gear wheel (25). Internal gear wheel (25) is connected in a rotationally fixed manner to a second sun gear wheel (26) of a downstream planetary gear mechanism, the output side (30) of which is connected to the shearing drum.

12 Claims, 3 Drawing Sheets

DRIVE ARRANGEMENT FOR SHEARING DRUMS

BACKGROUND OF THE INVENTION

1. Field of the Invention

The invention relates to a drive arrangement for shearing drums, in which the final gear reduction stages are arranged inside the shearing drum and at least one reduction stage is designed as a planetary gear mechanism.

2. Description of the Prior Art

Drive arrangements of the type mentioned at the beginning can be taken for example from U.S. Patent Specification 3,773,384. In the case of such known devices, a central drive shaft extends over the entire width of the shearing drum, with which shaft the individual zones of the rotating shearing drum are connected. Usually, shearing drums on drum shearing machines are supported by means of at least two carriers running in the longitudinal direction of the machine and pivotal in the vertical direction and therefore the drive of such shearing drums is usually carried out via two drive shafts, of which one drive shaft drives into rotating movement the region of the shearing drum located between the carriers of the shearing drum and the second drive drives into rotational movement the two lateral zones of the shearing drum. In these cases as well, axial shafts which critically restrict the space available inside the shearing drum are necessary. In particular for the feeding of fluid and the leading-in of control lines, for example for a spraying of picks, with the known designs of drive there usually only remains available as a free hollow space the region of the drums which is away from the axis, as a result of which considerable sealing problems arise. In the case of an actuation for drum widenings as well, which are known in the form of hydraulic actuations, the hydraulic medium cannot be led to the drives of such a drum widening without complex sealing measures.

SUMMARY OF THE INVENTION

The invention is now based on the object of providing a drive arrangement of the type mentioned at the beginning which only takes up a small space inside the shearing drum and which facilitates the arrangement of fluid or control lines without complex sealing measures or rotating lead-throughs. To achieve this object, the drive arrangement according to the invention, of the type mentioned at the beginning, consists substantially in that the first gear reduction stage arranged inside the shearing drum has intermediate gear wheels which are rotatably fixed to a rigid intermediate gear wheel carrier, connected to a supporting arm of the shearing drum, and in that the intermediate gear wheels are driven by a sun gear wheel and interact with an outer internal gear wheel, the internal gear wheel being connected in a rotationally fixed manner to the sun gear wheel of a downstream planetary gear mechanism, the output side of which is connected to the shearing drum. Due to the fact that the first gear reduction stage arranged inside the shearing drum has intermediate gear wheels which are rotatably fixed to a rigid intermediate gear wheel carrier connected to the supporting arm of the shearing drum, on the one hand the mounting of the shearing drum to such a rigid region is facilitated and on the other hand the prerequisite is created for using rigid parts to bring about a feed which opens out into the axial region of the shearing drum.

If the axial region of such a shearing drum can be kept completely free of gear parts, there is in principle the possibility of rigidly taking feeds right into the region to which the lines have to be connected and electric lines can also be led in such regions close to the axis in such a way that slip ring connections for taking power or signals can be connected. In the case of fluid lines, starting from such lines close to the axis, the distribution can be sealed at a small diameter, thereby reducing sealing problems considerably. In order then to keep the central region completely free from gear parts and at the same time to accomplish a correspondingly high reduction, as a result of which the rotating mass of the drive shaft mounted in the carrier can be reduced, the present invention is designed such that the intermediate gear wheels are driven by a sun gear wheel and interact with an outer internal gear wheel, the internal gear wheel being connected in a rotationally fixed manner to the sun gear wheel of a downstream planetary gear mechanism, the output side of which is connected to the shearing drum. Such a planetary gear mechanism as a downstream reduction stage may likewise be designed in a simple way with an axial region left free, as a result of which on the one hand a correspondingly high reduction can be accomplished and on the other hand the region of the shearing drum which is close to the axis or central can be kept free from shafts or gear parts. In a particularly simple way, this is achieved by the downstream planetary gear mechanism having an internal gear wheel which is fixed in place and is rigidly connected to the intermediate gear wheel carrier, and by the shearing drum being connected in a rotationally fixed manner to the carrier of the planetary gear wheels.

Due to the fact that the output side of the downstream planetary gear mechanism is formed by the carrier of the planetary gear wheels themselves, it is sufficient to provide the carrier with an axial bore or breakthrough in order to permit a corresponding lead-through even of rigid lines. In this case, altogether a gear mechanism is provided which manages with small overall dimensions in the axial direction and, in addition, has a rigid carrier which passes virtually entirely through the gear mechanism arrangement in the axial direction. As a result, the prerequisites for a simple and stable mounting are considerably improved and the criticality with respect to production tolerances can be reduced further due to the fact that the sun gear wheel of the first planetary gear reduction stage is arranged on a shaft stub mounted in an overhung and rotationally fixed manner in a bevel gear wheel, the bevel gear wheel meshing with the drive shaft. Such an overhung mounting reduces the wear of the intermediate gear wheels, unrotatable in the circumferential direction in the rigid carrier but rotatable about the respective axis, as well as of the output bevel gear wheel which is to be mounted in a simple way in the rigid carrier and meshes with the input bevel gear wheel of the motor shaft.

A further possibility of tolerance compensation during the course of power transmission via the gear train occurs at the transitional point of the rotatably mounted internal gear wheel of the first reduction stage with the sun gear wheel of the downstream planetary gear mechanism. In principle there is the possibility of designing this internal gear wheel, which fits externally over the intermediate gear wheels rotatably fixed to the rigid carrier, integrally with the sun wheel gear of the downstream planetary gear mechanism. However, in order to reduce the tolerance criticality here as well, the design is advantageously arranged such that the internal gear wheel of the first planetary gear reduction stage has an internal gearing which is in engagement with an external gearing of the sun gear wheel connected in a rotationally fixed manner to it, the external gearing of the sun gear wheel being interrupted by a peripheral groove between the engagement into the internal gear wheel and the region coming with the downstream planetary gear wheels. In the case of such a design, tooth wear is reduced and assembly is facilitated. Due to the fact that the tooth flanks in engagement with the revolving internal gear of the first reduction stage are separated by the peripheral groove from the tooth flanks of the sun gear wheel, which interacts with the planetary gear wheels of the downstream planetary reduction gear mechanism, opposing and unequal flank loads of the sun gear wheel are avoided and the lifetime or service life of the sun gear wheel is increased.

The internal gear wheel of the first intermediate reduction gear mechanism may be designed in a simple way in the form of a pot and, as already mentioned, fit over the rigid carrier of the intermediate gear wheels. In principle, this internal gear wheel does not require any special mounting if, as mentioned before, it is connected to the downstream sun gear wheel via a toothed coupling, but such a pot-shaped configuration also permits a fully satisfactory mounting of this internal gear wheel, should this appear to be necessary.

Due to the fact that the output side of the downstream planetary gear mechanism is formed by the planetary gear wheel carrier itself, on the one hand a higher reduction is achieved with smaller overall dimensions and on the other hand the possibility is offered in a simple way of securing the planetary gear wheels against axial displacement. For this purpose, the design is advantageously arranged such that the planetary gear wheels of the downstream reduction stage are secured against axial displacement by means of a support ring connected in a rotationally fixed manner to the rotatably mounted shearing drum. All in all, with such a design of the gear mechanism, a hollow space for receiving lubricating agents which is sealed off by the planetary gear wheel carrier of the downstream planetary gear mechanism and the sealing-off of the gear mechanism from the hollow shearing drum is only necessary at that point at which lead-throughs, for example for fluid or electric lines, are provided. Since these lead-throughs become possible in the region close to the axis, here there is for the necessary seals are considerably less complexity.

A further improvement in the mounting of the shearing drum itself can be brought about on account of the rigid carrier of the intermediate gear wheels of the first reduction stage. For this purpose, the shearing drum is advantageously mounted on the rigid carrier part of the intermediate gear wheels.

However, the rigid carrier of the intermediate gear wheels of the first reduction stage at the same time also permits a simple and secure mounting of gear parts of the subsequent planetary gear mechanism. In this case, the design is advantageously arranged such that the sun gear wheel of the downstream planetary reduction gear mechanism is rotatably mounted on an axial bearing prolongation of the rigid carrier of the intermediate gear wheels and is of a hollow design, the axial hollow space of the sun gear wheel aligning with an axial breakthrough of the planetary gear wheel carrier and opening out into the inside of the hollow shearing drum, the hollow design of such a sun gear wheel ensuring the simple possibility of leading control lines, fluid lines or the like through in the region close to the axis.

As a departure from known designs, in which separate drive shafts are provided for the inner region and the outer region of a drum in each case, the present invention is designed such that just one common drive shaft is sufficient. Since the gear mechanism itself takes up little space in the axial direction, a compact and stable design of the gear mechanism is obtained, this mechanism being advantageously such that two separate gear mechanisms are connected to a common drive shaft. Each of the two separate mechanisms include an inner reduction stage adjacent to the drive shaft having a rigid carrier for the intermediate gear wheels. As as already stated before in the case of a reduction gear with intermediate gear wheels mounted on a rigid carrier, the connection to the bevel gear wheel may be carried out in a simple way on both such gear mechanisms such that the sun gear wheels of the two gear mechanisms are supported by shaft stubs which are in each case mounted separately in an overhung and rotationally fixed manner in the first output bevel gear wheel inside the shearing drum, as a result of which tolerances, in particular bearing tolerances of the mounting of the shearing drum itself, are reliably compensated.

A secure mounting of the first bevel gear wheel arranged inside the shearing drum can be achieved by the first output bevel gear wheel arranged inside the shearing drum being mounted on the housing parts rigidly connected to the supporting arm and by the rigid housing parts being rigidly connected to the rigid carriers of the intermediate gear wheels. The assembly of the gear mechanism can be simplified by the rigid internal gear wheel of the downstream planetary gear reduction stage being pushed by means of a gearing on to the rigid carrier of the intermediate gear wheels and connected in a rotationally fixed manner to the carrier.

BRIEF DESCRIPTION OF DRAWING

The invention is explained in more detail below with reference to exemplary embodiments diagrammatically represented in the figure in which.

DETAILED DESCRIPTION OF THE PRESENTLY PREFERRED EXEMPLARY EMBODIMENT

Figure 1:
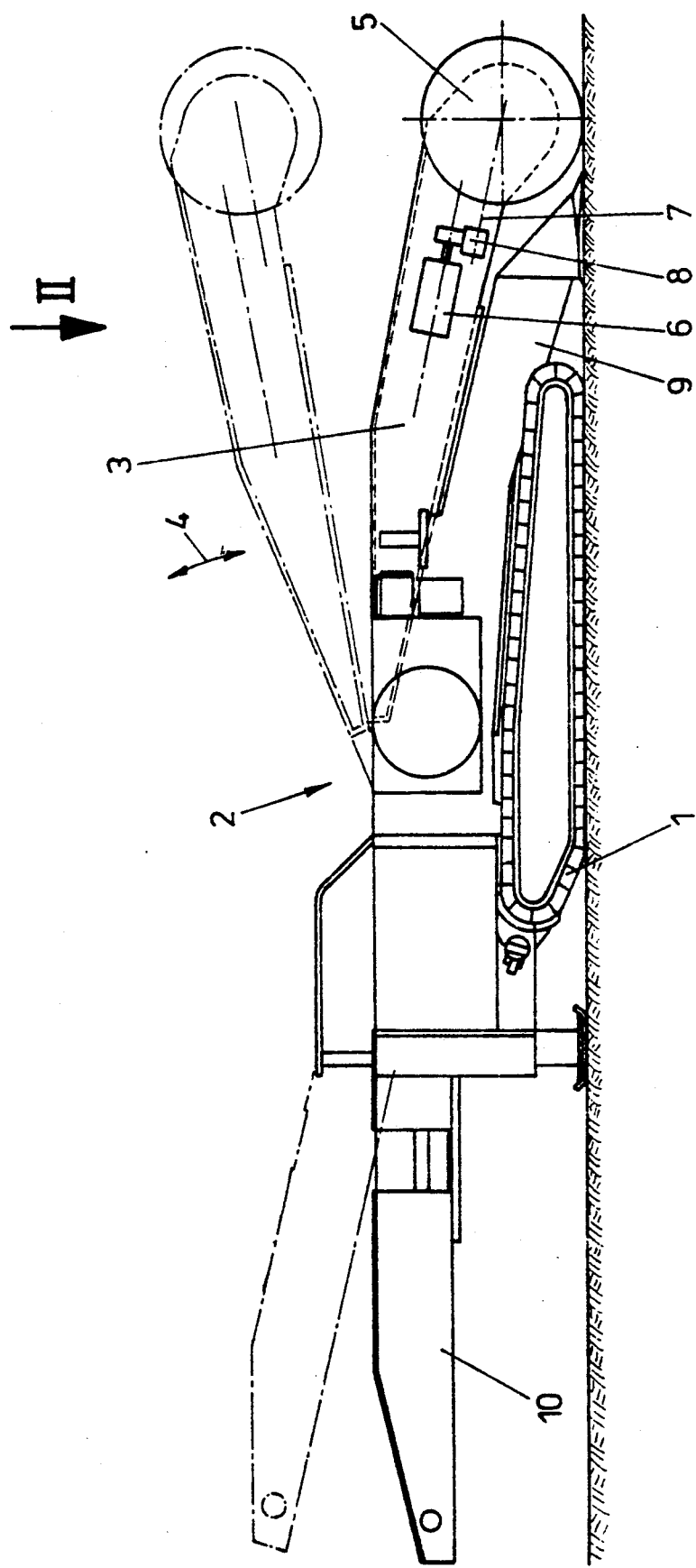
FIG. 1 shows a side view of a selective cut shearing machine with a shearing drum.

In FIG. 1, a shearing machine 2 which can be moved along on a crawler undercarriage 1 is shown, a rotatably mounted shearing drum 5 being arranged on a supporting arm 3 and able to pivot in the direction of the double-headed arrow 4. The drive motor for the rotary drive of the shearing drum 5 is diagrammatically indicated by 6, the motor shaft lying axially parallel to the drive shaft 7 and being connected to the said drive shaft 7 via a first gear mechanism 8. The drive shaft 7 opens out in the region of the carriers of the drum 5 into the inside of the shearing drum 5, as explained in further detail below.

In the representation according to FIG. 1, the drum shearing machine 2 also has a loading device 9, formed by a ramp, and a vertically adjustable conveyor 10 is diagrammatically indicated at the rear end of the machine.

Figure 2:
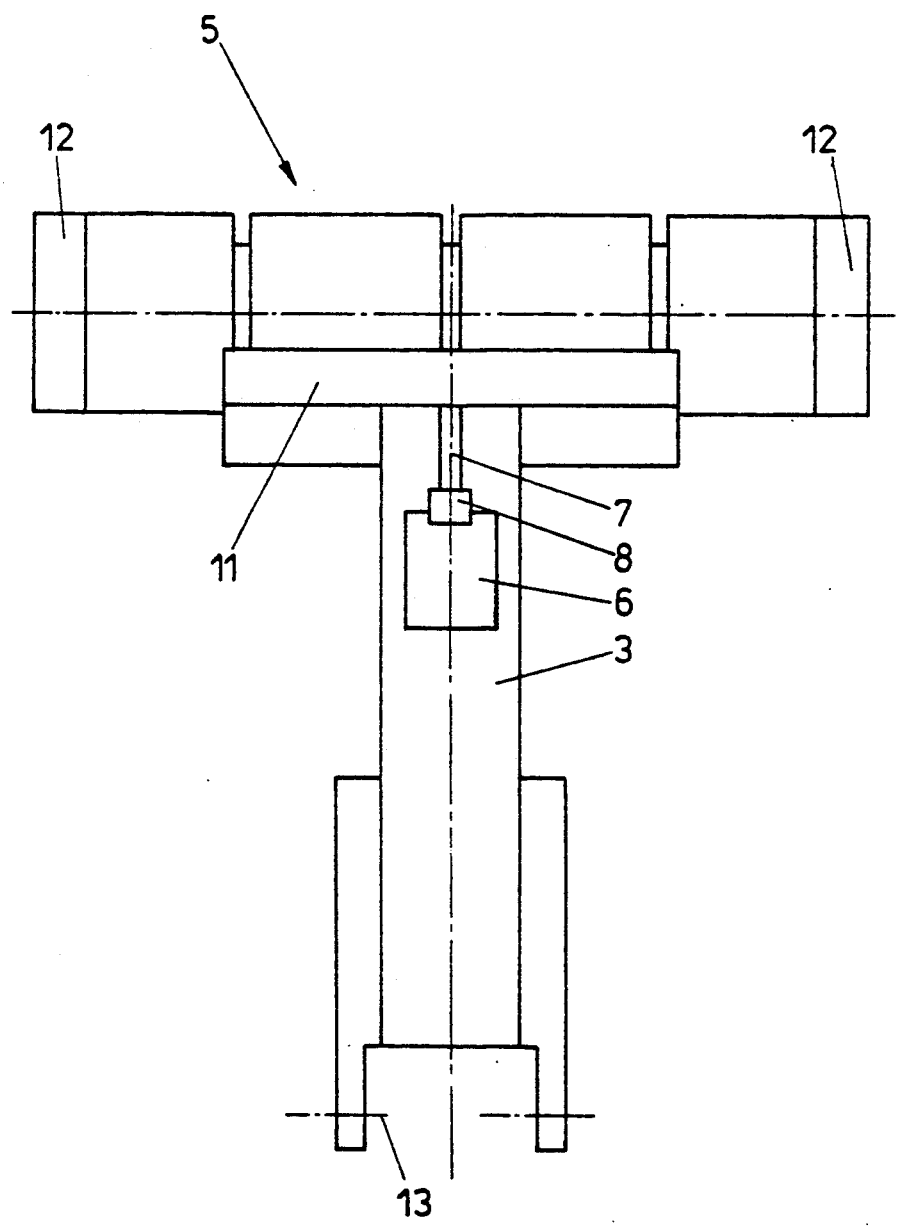
FIG. 2 shows a view in the direction of the arrow II of the supporting arm structure of such a shearing drum and, FIG. 3 shows an axial section through a part of the shearing drum with a reduction gear mechanism according to the invention.

In the representation according to FIG. 2, it can be seen that the shearing drum 5 is mounted on the supporting arm 3, the mounting of the supporting arm being diagrammatically indicated by 11. Arranged in turn inside the supporting arm 3 is the drive motor 6 and the gear mechanism 8, and the transmission of movement takes place by means of a single common drive shaft 7 into the inside of the shearing drum 5. The shearing drum 5 has in this case inner regions, which lie inside the mounting 11, and lateral regions, which project beyond the mounting 11 and which may comprise for example a diagrammatically indicated drum widening 12. The pivoting of the shearing arm 3 occurs around the substantially horizontal swivel axis indicated by 13.

Figure 3:
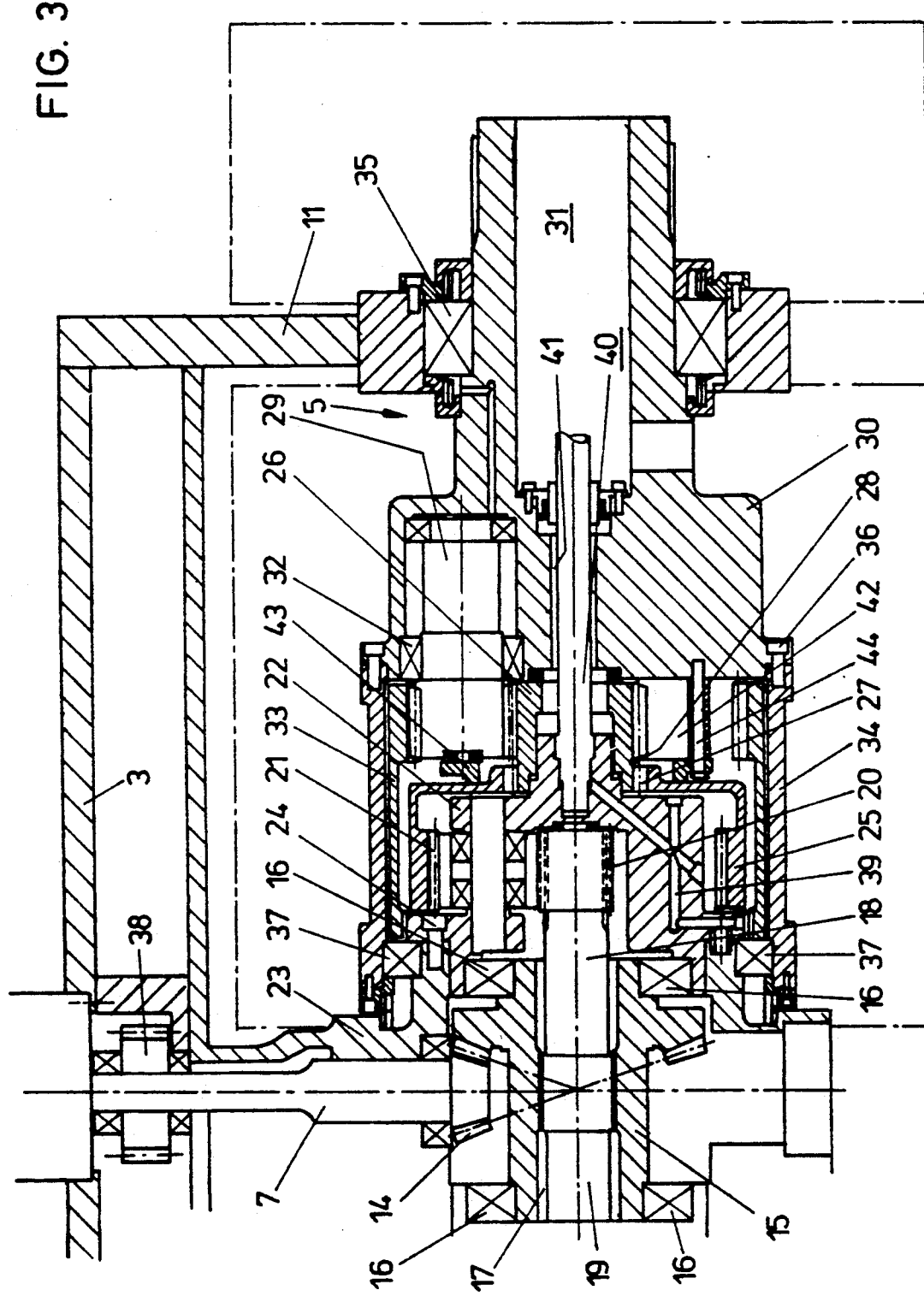

The gear mechanism for the drive of the shearing drum is illustrated in FIG. 3. In FIG. 3, the common drive shaft is in turn denoted by 7 and is equipped with a bevel gear wheel 14. Inside the shearing drum 5, a first bevel gear wheel 15 is rotatably mounted, the mounting being denoted diagrammatically by 16 and supported in a rigid housing part. The first bevel gear wheel 15 mounted in this way inside the shearing drum 5 has an internal gearing 17, into which overhung shaft stubs 18 and 19 enter. The two shaft stubs 18, 19 are of substantially identical design, the further gear reduction described in more detail below for the shaft stub 18 applying analogously and symmetrically also to the further arrangement which follows the shaft stub 19 but is not shown. The shaft stub 18 has at its free end a sun wheel gearing 20, which meshes with the gearing of intermediate gear wheels 21.

The intermediate gear wheels 21 are rotatably mounted on a rigid carrier 22, the rigid carrier 22 being connected to the rigid housing part 23, for example by a screw joint 24. The rigid carrier 22 with the intermediate gear wheels 21 is enclosed by an internal gear wheel 25, which internal gear wheel 25 is in turn connected in a rotationally fixed manner to the sun gear wheel 26 of a downstream planetary gear mechanism. The connection of the internal gear wheel 25 to the sun gear wheel 26 is carried out by means of a gearing 27, which is separated from the external gearing of the sun gear wheel 26 by a peripheral groove 28. The flanks of the external gearing of the sun gear wheel 26 are in engagement with the gearing of planetary gear wheels 29 and the carrier of these planetary gear wheels 29 is integrally connected to the output part 30 of the gear mechanism of the shearing drum, the basic body of the shearing drum being connected on the outside in a rotationally fixed manner to the output part 30 by means of a splined shaft connection and the inner shaft parts are connected in a rotationally fixed manner to the same output part 30 by means of a connection formed, for example, by a square. The output part 30 of the shearing drum is designed hollow inside. The hollow space extends in the axial direction being indicated diagrammatically by 31. The planetary gear wheels 29 are mounted via bearings 32 in the output part 30 of the shearing drum 5. The output part 30 thus directly forms the carrier of the planetary gear wheels 29. The outer wall of the shearing drum 5 connected to the output part 30 has picks (not shown in FIG. 3) which can be brought into engagement with the material to be extracted and the outer contour of which is indicated in broken lines. In order to transmit the rotary movement of the sun gear wheel 26 onto the output part 30 of the planetary gear wheels 29, a further internal gear wheel is also necessary. This further internal gear wheel 33 is connected in a rotationally fixed manner to the carrier 22 of the intermediate gear wheels. The internal gear wheel, which is fixed in place and connected in a rotationally fixed manner to the carrier of the intermediate gear wheels, is covered on the outside by a shearing drum part 34 connected to the output part 30, with the result that picks which can be set in rotation together with the output part 30 of the shearing drum can be arranged in this region as well. The shearing drum may be supported in the region of the output part 30 via bearing 35 on a part of the mounting 11 of the supporting arm 3, the wall part 34 of the shearing drum 5 which is connected via a screw joint 36 to the output part 30 of the shearing drum being supported via bearing 37 on the gear housing. The mounting of the drive shaft 7 on the supporting arm 3 is diagrammatically indicated by 38.

With such a design of the reduction gear mechanism, the possibility is created of leading through the rigid carrier 22 lines 39 which open out into a region 40 close to the axis. If then, as shown in FIG. 3, the axial region of the output part 30 which forms the carrier of the planetary gear wheels 29 likewise has an axial breakthrough 41, an open connection between the feed of the lines 39 in the region 40 close to the axis and the hollow inside 31 of the shearing drum is obtained, with the result that any desired lines, such as fluid lines or electric lines, can be led out from the gear housing with little complexity of the sealing means. The inside of the gear housing is denoted by 42 and can be filled in a conventional way with lubricating oil. In this situation as well, the complexity of the sealing means is reduced considerably on account of the relatively small areas to be sealed in the region of the axial breakthrough 41 of the output part 30 of the planetary gear wheels 29.

An axial securing of the planetary gear wheels 29 against displacement in the axial direction can be accomplished by a securing ring 43, which is connected via screws 44 to the output part 30 of the shearing drum 5, the distance between the output part 30 and the axial securing disc 43 being set by pieces of pipe.

We claim:

1. A drive arrangement for a shearing drum, wherein final gear reduction stages are arranged inside the shearing drum and at least one reduction stage is designed as a planetary gear mechanism, said drive arrangement comprising:

a first gear reduction stage arranged inside the shearing drum having intermediate gear wheels rotatably fixed to a rigid intermediate gear wheel carrier; and a supporting arm of the shearing drum connected to said carrier;

wherein the intermediate gear wheels are driven by a sun gear wheel and interact with an outer internal gear wheel; and wherein the outer internal gear is connected in a rotationally fixed manner to a second sun gear wheel of a downstream planetary gear mechanism, said downstream planetary gear mechanism having an output side which is connected to the shearing drum.

2. A drive arrangement for a shearing drum, wherein final gear reduction stages are arranged inside the shearing drum and at least one reduction stage is designed as a planetary gear mechanism, said drive arrangement comprising:

a first gear reduction stage arranged inside the shearing drum having intermediate gear wheels rotatably fixed to a rigid intermediate gear wheel carrier; and a supporting arm of the shearing drum connected to said carrier, wherein:

the intermediate gear wheels are driven by a sun gear wheel and interact with an outer internal gear wheel;

the outer internal gear wheel is connected in a rotationally fixed manner to a second sun gear wheel of a downstream planetary gear mechanism, said downstream planetary gear mechanism having an output side which is connected to the shearing drum;

the downstream planetary gear mechanism includes an internal gear wheel fixed in place and rigidly connected to the intermediate gear wheel carrier; and the shearing drum is connected in a rotationally fixed manner to the carrier of the planetary gear wheels.

3. A drive arrangement according to claim 1 or 2, wherein the sun gear wheel of the first planetary gear reduction stage is arranged on a shaft stub mounted in an overhung and rotationally fixed manner in a bevel gear wheel, the bevel gear wheel meshing with a drive shaft.

4. A drive arrangement according to claim 3, wherein the sun gear wheel is supported by shaft stubs mounted in an overhung and rotationally fixed manner in the bevel gear wheel inside the shearing drum.

5. A drive arrangement according to claim 3, wherein the bevel gear wheel arranged inside the shearing drum is mounted on housing parts rigidly connected to the supporting arm, and wherein the housing parts are rigidly connected to the carriers of the intermediate gear wheels.

6. A drive arrangement according to claim 1 or 2, wherein the internal gear wheel of the first planetary gear reduction stage has an internal gearing engaged with an external gearing of the second sun gear wheel and connected in a rotationally fixed manner to the second sun gear wheel with external gearing of the sun gear wheel being interrupted by a peripheral groove between an engagement into the internal gear wheel and a region proximate the downstream planetary gear mechanism.

7. A drive arrangement according to claim 1 or 2, wherein the outer internal gear wheel of the first intermediate reduction gear mechanism is in the form of a pot and fits over the carrier of the intermediate gear wheels.

8. A drive arrangement according to claim 1 or 2, wherein the planetary gear mechanism of the downstream reduction stage is secured against axial displacement by means of a support ring connected in a rotationally fixed manner to the rotatably mounted shearing drum.

9. A drive arrangement according to claim 1 or 2, wherein the shearing drum is mounted on the rigid carrier part of the intermediate gear wheels.

10. A drive arrangement according to claim 1 or 2, wherein the second sun gear wheel is rotatably mounted on an axial bearing extension of the carrier and is hollow, an axial hollow space of the sun second gear wheel being aligned with an axial breakthrough of the carrier and opening out into inside of the hollow shearing drum.

11. A drive arrangement according to claim 1 or 2, wherein two separate gear mechanisms are connected to a common drive shaft, and wherein each mechanism includes an inner reduction stage adjacent to the drive shaft having the carrier for the intermediate gear wheels.

12. A drive arrangement according to claim 2, wherein the internal gear wheel of the downstream planetary gear reduction stage is pushed by a gearing on to the carrier of the intermediate gear wheels and is connected in a rotationally fixed manner to the carrier.

* * * * *